United States Patent Office 3,232,939
Patented Feb. 1, 1966

3,232,939
PYRIDYLETHYL-BARBITURIC ACIDS
Seymour L. Shapiro, deceased, late of Hastings on Hudson, N.Y., by Florence M. Shapiro, executrix, Hastings on Hudson, N.Y., and Louis Freedman, Bronxville, and Victor Bandurco, Flushing, N.Y., assignors to U.S. Vitamin & Pharmaceutical Corporation, New York, N.Y., a corporation of Delaware
No Drawing. Filed Aug. 23, 1962, Ser. No. 219,344
6 Claims. (Cl. 260—256.4)

This invention relates to novel compounds and compositions and to a method of preparing and using said compounds. More particularly the invention relates to novel compounds and compositions having anti-tremorine activity which are therapeutically useful as will be hereafter described.

The novel compounds of this invention are pyridylethyl-barbituric acids of the structure

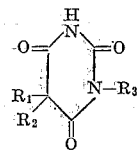

wherein $R_1$ is a 2-(pyridyl)ethyl group, $R_2$ is a methyl, ethyl or phenyl radical, and $R_3$ is a lower alkyl radical containing from 1 to 4 carbon atoms, a phenyl, methoxyphenyl, tolyl, or halophenyl radical. The pyridyl portion of the 2-(pyridyl)ethyl group may be 2, 3, or 4-pyridyl.

The new compounds of the present invention may be prepared by condensing a malonic ester of the formula

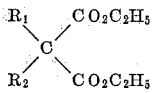

wherein $R_1$ and $R_2$ is the same as above, with a urea of the formula

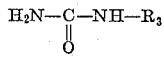

wherein $R_3$ is the same as above. The malonic esters can be readily obtained by the pyridylethylation of the desired malonic ester with a vinylpyridine according to the method of Doering and Weil, J. Am. Chem. Soc., 69, 2463 (1947). The compounds may also be obtained by the addition of a vinylpyridine to the appropriately substituted barbituric acid.

The new compounds are amphoteric and may be used in the free form or as acid addition salts, or basic salts, such as, for example, the sodium salts. When administered in solution, such as, for example, by subcutaneous injection, it is preferred to use the sodium salts.

In addition to exhibiting the potent anti-tremorine activity which makes the novel compounds of this invention particularly useful in the treatment of Parkinson's disease, the compounds also showed a strong enhancement of the sleeping time activity of Evipal. This potentiation is unusual since the novel compounds, while they are barbituric acids, do not exhibit the hypnotic and sedative properties shown by the known barbituric acids.

In the treatment of Parkinson's disease it is desirable to administer the compound in doses ranging from 10 mb. to 1 gram, the exact amount being determined according to the weight, age, and condition of the patient.

The following examples will illustrate in detail typical procedures for preparing the novel compounds and compositions of this invention without, however, limiting the same thereto.

EXAMPLE I

*5-methyl-5-[2-(4-pyridyl)ethyl]-1-methyl-barbituric acid*

A solution of 1.0 g. sodium (0.043 g.-atom) in 20 ml. ethanol was treated with 7 g. (0.025 mol) of diethyl methyl-[2-(4-pyridyl)ethyl]malonate, and 1.9 g. (0.025 mol) N-methyl-urea in 20 ml. hot ethanol and refluxed for 9 hours. Upon cooling 100 ml. water was added and the ethanol removed under reduced pressure. The aqueous residue was washed with ether and upon neutralization with acid to pH 7, the product separated out. The product upon recrystallization from ethanol melted at 204–206° C.

*Analysis.*—Calcd. for $C_{13}H_{15}N_3O_3$: C, 61.1; H, 6.2; N, 15.3. Found: C, 60.8; H, 6.4; N, 14.9.

Using the above procedure with the appropriately substituted malonate and urea, the following compounds were prepared:

$R_1 = [2\text{-}(2\text{-pyridyl})\text{ethyl}]$

| $R_2$ | $R_3$ | M.P. (° C.) |
|---|---|---|
| $C_2H_5$ | $CH_3$ | 150–153 |
| $C_2H_5$ | $C_2H_5$ | 123–124 |
| $C_2H_5$ | $n\text{-}C_4H_9$ | 85 |
| $C_2H_5$ | $C_6H_5$ | 185–187 |

$R_1 = [2\text{-}(4\text{-pyridyl})\text{ethyl}]$

| $R_2$ | $R_3$ | M.P. (° C.) |
|---|---|---|
| $CH_3$ | $C_2H_5$ | 176–177 |
| $CH_3$ | $n\text{-}C_4H_9$ | 174–175 |
| $CH_3$ | $C_6H_5$ | 125–126 |
| $C_2H_5$ | $CH_3$ | 148–150 |
| $C_2H_5$ | $C_2H_5$ | 110 |
| $C_2H_5$ | $n\text{-}C_4H_9$ | 102–104 |
| $C_2H_5$ | $C_6H_5$ | 177–178 |
| $C_2H_5$ | $o\text{-}CH_3OC_6H_4$ | 191–193 |
| $C_2H_5$ | $p\text{-}CH_3OC_6H_4$ | 190–192 |
| $C_2H_5$ | $p\text{-}CH_3C_6H_4$ | 192–194 |
| $C_2H_5$ | $p\text{-}BrC_6H_4$ | 186–187 |
| $C_2H_5$ | $o\text{-}ClC_6H_4$ | 187–190 |
| $C_2H_5$ | $m\text{-}ClC_6H_4$ | 111–112 |
| $C_2H_5$ | $p\text{-}ClC_6H_4$ | 194–195 |
| $C_6H_5$ | $CH_3$ | 222–224 |
| $C_6H_5$ | $C_2H_5$ | 176 |
| $C_6H_5$ | $n\text{-}C_4H_9$ | 123–125 |
| $C_6H_5$ | $C_6H_5$ | 247–249 |

EXAMPLE II

*5-ethyl-5-[2-(4-pyridyl)ethyl]-1-(m-tolyl)-barbituric acid*

(a) *1-(m-tolyl)-5-ethyl-barbituric acid.*—A solution of 1.5 g. (0.065 g.-atom) of sodium in 50 ml. ethanol was treated with 6.4 g. (0.034 mole) of diethyl ethyl-malonate, and 5.1 g. (0.034 mole) of m-tolyl urea in 25 ml. hot ethanol and refluxed for 15 hours. When cool, water (100 ml.) was added and the alcohol removed. The aqueous residue was washed with ether and on acidification (pH 3) the product 6.1 g. (73%) separated, M.P. 175–177° C.

(b) *5-ethyl-5-[2-(4-pyridyl)ethyl]-1-(m-tolyl)barbituric acid.*—A mixture of 6.1 g. (0.0247 mole) of 1-(m-tolyl)-5-ethyl-barbituric acid and 2.6 g. (0.0247 mole) of 4-vinylpyridine in 100 ml. acetonitrile was heated on the steam bath for 1 hour. The solvent was removed and the residue was triturated with water, followed by acetonitrile and then recrystallized from ethanol to give 4.8 g. (55%) of product, M.P. 167–169° C.

*Anaylsis.*—Calcd. for $C_{20}H_{21}N_3O_3$: C, 68.4; H, 6.0; N, 11.9. Found: C, 68.0; H, 6.2; N, 11.7.

The compounds of this invention are desirably formulated in the form of tablets or capsules containing from about 10 mg. to 1 g. of the active ingredient in dosage unit form. These dosage forms are suitably combined with extenders, fillers and lubricants prepared in the conventional manner. Alternatively the compounds can be formulated in solution, preferably in aqueous solution in the form of their water-soluble salts.

Examples III to V describe the preparation of representative pharmaceutical formulations.

EXAMPLE III

*Tablets.*—Twenty-five grams of 5-ethyl-5-[2-4(pyridyl) ethyl]-1-(m-tolyl)-barbituric acid, 48 grams powdered sugar and 32 g. starch were mixed and granulated with a 10% gelatin solution. The granulation was dried and ground to fine granules for tabletting. About 1% magnesium stearate was added as a lubricant together with sufficient corn starch to give a weight of about 2.5 grains per tablet. The product was compressed to give about 1,000 tablets containing about 25 mg. of the active ingredient per tablet.

EXAMPLE IV

*Liquid (syrup).*—Twenty-five grams of the sodium salt of 5-ethyl-5-[2-(4-pyridyl)-ethyl]-1-(m-tolyl) - barbituric acid were dissolved in 1 liter of water. Five g. sodium benzoate and 35 ml. liquid sugar were added and stirred until dissolved. Flavor, as desired, was added and water q.s. to give a solution containing about 25 mg. of active ingredient per teaspoon was added.

EXAMPLE V

*Injectable solution.*—Twenty-five grams of the sodium salt of 5-ethyl-5-[2-(4-pyridyl)-ethyl]-1-(m-tolyl)-barbituric acid was dissolved in water for injection q.s. 1 liter. The solution was filled through fine sintered glass, filled into sterile 1 ml. ampuls and sterilized at 110° C. for 30 minutes to give about 1,000 ampuls each containing about 25 mg. of active ingredient.

We claim:
1. 1-(n-butyl)-5-methyl-5-[2-(4-pyridyl) - ethyl]-barbituric acid.
2. 1-(n-butyl)-5-ethyl-5-[2-(4-pyridyl) - ethyl]-barbituric acid.
3. 5-ethyl-1-phenyl-5-[2-(4-pyridyl) - ethyl]-barbituric acid.
4. 5-ethyl-1-phenyl-5-[2-(3-pyridyl) - ethyl]-barbituric acid.
5. 5-ethyl-5-[2-(4-pyridyl)-ethyl]-1-(m-tolyl)-barbituric acid.
6. A compound of the formula

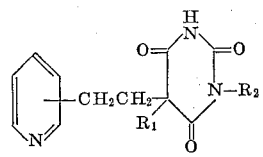

wherein $R_1$ is selected from the group consisting of methyl, ethyl and phenyl and $R_2$ is selected from the groups consisting of lower alkyl of 1 to 4 carbon atoms, phenyl, methoxyphenyl, halophenyl and tolyl.

References Cited by the Examiner

UNITED STATES PATENTS

| 2,784,141 | 3/1957 | Jacobsen | 167—65 |
| 2,891,890 | 6/1959 | Adamson | 167—65 |
| 2,953,566 | 9/1960 | Sommers | 260—356.4 |
| 3,048,588 | 8/1962 | Cain | 260—256.4 |

OTHER REFERENCES

Dox et al.: Jour. Amer. Chem. Soc. vol. 51, 1929, pp. 316–318.

Everett et al.: Science, vol. 124, 1956, page 79.

Kato et al.: Yakugaku Zasshi, vol. 80, 1960, pages 1293–1295, abstracted by Chem. Abstracts, vol. 55, par. 3601e, 1961.

Neuberg et al.: Chem. Abstracts, vol. 16, page 946 (1922).

Shapiro et al.: Jour. Amer. Chem. Soc., vol. 79, 1957, pages 2811–2814.

NICHOLAS S. RIZZO, *Primary Examiner.*

DUVAL T. McCUTCHEN, *Examiner.*